United States Patent
Peterson

(10) Patent No.: US 10,581,232 B2
(45) Date of Patent: Mar. 3, 2020

(54) UNIVERSAL RING AND PLATE ASSEMBLY FOR ELECTRICAL BOX

(71) Applicant: D. Peterson Construction Co., Inc., Highland Park, IL (US)

(72) Inventor: David Peterson, Highland Park, IL (US)

(73) Assignee: D. Peterson Construction Co., Inc., Highland Park, IL (US)

( * ) Notice: Subject to any disclaimer, the term of this patent is extended or adjusted under 35 U.S.C. 154(b) by 0 days.

(21) Appl. No.: 16/249,535

(22) Filed: Jan. 16, 2019

(65) Prior Publication Data

US 2019/0222011 A1 Jul. 18, 2019

Related U.S. Application Data

(63) Continuation-in-part of application No. 15/873,209, filed on Jan. 17, 2018.

(51) Int. Cl.
*H02G 3/12* (2006.01)
*H02G 3/08* (2006.01)

(52) U.S. Cl.
CPC ............... *H02G 3/12* (2013.01); *H02G 3/081* (2013.01)

(58) Field of Classification Search
CPC ............. H02G 3/12; H02G 3/14; H02G 3/081
USPC ........... 174/480, 66–67, 50, 520, 53, 58, 61; 220/241–242, 3.2–3.3, 3.8–3.9, 3.92
See application file for complete search history.

(56) References Cited

U.S. PATENT DOCUMENTS

| | | | |
|---|---|---|---|
| 4,835,343 A | 5/1989 | Graef et al. | |
| 4,927,039 A | 5/1990 | McNab | |
| 4,998,635 A | 3/1991 | Vink et al. | |
| 5,931,325 A * | 8/1999 | Filipov | H02G 3/081 174/57 |
| 6,184,468 B1 | 2/2001 | Speziale | |
| 7,301,099 B1 | 11/2007 | Korcz | |
| 7,468,486 B2 * | 12/2008 | Yan | H02G 3/123 174/50 |
| 7,495,170 B2 | 2/2009 | Dinh et al. | |
| 7,531,743 B2 | 5/2009 | Johnson et al. | |
| 7,554,037 B1 | 6/2009 | Shotey et al. | |
| 7,637,385 B2 | 12/2009 | Wegner et al. | |
| 7,820,912 B1 | 10/2010 | Shotey et al. | |
| 8,013,243 B2 | 9/2011 | Korcrz et al. | |
| 8,067,703 B1 | 11/2011 | Gretz | |
| 8,536,452 B2 | 9/2013 | Jafari | |

(Continued)

OTHER PUBLICATIONS

Apr. 15, 2019—(WO) International Search Report and Written Opinion—App. No. PCT/US19/13993.

*Primary Examiner* — Chun Hoi Cheung
*Assistant Examiner* — Brijesh V. Patel
(74) *Attorney, Agent, or Firm* — Banner & Witcoff, Ltd.

(57) ABSTRACT

A universal ring and plate assembly is disclosed for use with an electrical or utility box. The universal ring and plate design can achieve any finish wall thickness by stacking plates and securing them to the universal ring, even after the drywall, tile, stone and/or other wall materials have been installed. The universal ring and plate simplifies the current installation process, eliminates the need for the multiple different depth rings, and accommodates all changes to the finished wall thickness by the owner, architect or builder, without having to tear down portions of the finished wall.

18 Claims, 14 Drawing Sheets

(56) References Cited

U.S. PATENT DOCUMENTS

| | | | | |
|---|---|---|---|---|
| 8,592,703 B2* | 11/2013 | Johnson | ............... | H01H 23/02 |
| | | | | 200/339 |
| 8,658,894 B1* | 2/2014 | Witherbee | ............... | H02G 3/14 |
| | | | | 174/50 |
| 8,680,394 B2* | 3/2014 | Korcz | ............... | H02G 3/20 |
| | | | | 174/58 |
| 8,759,676 B1* | 6/2014 | Gretz | ............... | H02G 3/185 |
| | | | | 174/50 |
| 8,933,331 B1 | 1/2015 | Gretz | | |
| 8,933,350 B1 | 1/2015 | Gretz | | |
| 8,987,593 B2 | 3/2015 | Korcz et al. | | |
| 9,553,438 B2* | 1/2017 | Korcz | ............... | H02G 3/126 |
| D801,284 S | 10/2017 | Hagarty | | |
| 2003/0116341 A1 | 6/2003 | Gilleran | | |
| 2006/0061978 A1 | 3/2006 | Palermo | | |
| 2008/0202790 A1 | 8/2008 | Fabrizi et al. | | |
| 2009/0139742 A1 | 6/2009 | Bhosale | | |
| 2009/0193724 A1 | 8/2009 | Struthers et al. | | |
| 2009/0194312 A1 | 8/2009 | Jolly et al. | | |
| 2010/0032180 A1 | 2/2010 | Korcz et al. | | |
| 2010/0132972 A1 | 6/2010 | Chaumeny et al. | | |
| 2011/0005800 A1 | 1/2011 | Magno, Jr. | | |
| 2013/0319715 A1 | 12/2013 | Korcz et al. | | |
| 2014/0060878 A1 | 3/2014 | Trojanowski | | |
| 2014/0182876 A1 | 7/2014 | Trojanowski | | |
| 2014/0224792 A1 | 8/2014 | Beneke | | |
| 2014/0238738 A1 | 8/2014 | Korcz et al. | | |
| 2014/0262417 A1 | 9/2014 | Korcz et al. | | |
| 2014/0367136 A1 | 12/2014 | Trojanowski | | |
| 2017/0256927 A1 | 9/2017 | Padilla et al. | | |

\* cited by examiner

UNIVERSAL RING AND PLATE ASSEMBLY FOR ELECTRICAL BOX

CROSS REFERENCE TO RELATED APPLICATION

This application is a continuation-in-part application of and claims priority to U.S. Ser. No. 15/873,209, filed Jan. 17, 2018.

FIELD OF INVENTION

The disclosure relates to electrical boxes used during building construction, and more specifically to a universal extension ring and plate assembly for use with the electrical boxes.

BACKGROUND

During construction of buildings, and particularly home and commercial buildings, electrical boxes are used throughout the building to create locations where electrical power can be safely provided at those locations in the building. Metal conduit is typically coupled to these electrical boxes through which the electrical wiring passes. There are numerous sizes and shapes of electrical boxes in existence. There are also numerous building safety codes—codes that vary from city to city—that must be followed by contractors during building construction. All electrical boxes and conduit must comply with these codes otherwise the building will not pass inspection.

A known problem with existing electrical boxes and the rings used with these boxes is that one needs to know the finish thickness of each wall before one can even begin to drywall or apply any wall material. Once the finish thickness is determined, and if the electrical box is recessed too deep within the wall, a ring must be added so that when an electrical outlet, for example, is mounted to the ring the outlet will be nearly flush with the outer surface of the wall. The known rings are sold in several varieties of depths from ½ inch to 2 inches in depth. The deeper rings, however, are very expensive and are not commonly available at most stores. If the wall thickness changes during the construction process, by adding tile, cabinets, wood paneling or other finishing material to the wall, the installed rings need to removed and a replacement ring added. This results in a very expensive and time consuming tear down of the wall surrounding the installed ring so that the incorrect ring can be taken out and the correct one added.

One attempt to solve this problem has included the creation of adjustable rings which permit the adjustment of the ring depth. These adjustable rings, however, are very complicated devices with multiple parts. They are also very costly, and they still need to be installed at each desired location before the drywall or other wall materials can even be installed. For an entire house or commercial building, these adjustable rings are nearly cost prohibitive.

Although attempts have been made to try and overcome the above described problems, including the problems with adjustable rings, there remains a need for a system that is universal, inexpensive, easily installed and removed, and more importantly, can be added to a wall that already has its drywall, tile, cabinets or wood paneling or any other wall material installed, meaning that no teardown of the wall is required. The present invention provides such a solution.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to one aspect, the universal ring of the invention may be mounted to an electrical box. The universal ring has a plurality of screw holes, in one embodiment six holes, which allow for flat, planar stackable plates to be secured over it. The universal ring may be made in two standard thicknesses to accommodate ½ inch or ⅝ inch drywall. Both thicknesses allow a builder to stack the rings to a desired wall thickness even after drywall or other wall material has been installed. This unique design allows for these stackable plates to remain secured to the electrical box, even when the electrical device, such as an electrical outlet, is removed. In one exemplary aspect, four outer screws may be used for securing the stackable plates, while the two center screws will remain for fastening the desired electrical device.

In another exemplary aspect, the stackable plates may be made in a number of different thicknesses, including ⅛, ¼ and ½ inch thickness, and each of these plates may be stacked to achieve desired finished depths, even after the drywall, tile, stone or other wall materials have been installed.

As indicated, the universal ring and plate design can achieve any finish wall thickness by stacking plates and securing them to the universal ring, even after drywall, tile, stone and other materials have been applied to the wall. The invention simplifies the current process of having to know the finished wall thickness prior to installation of the electrical box and ring. It also eliminates the need for the multiple different depth rings. This invention eliminates the costly and time consuming tear down of the wall if the incorrect ring depth has been installed. This design also allows and accommodates all changes to finished wall thickness by the owner, architect or builder—a common occurrence. The invention effectively replaces all costly, adjustable rings and is the only product that can be added after drywall has been installed, while remaining secured when the electrical device is removed. The design of the invention eliminates the need to ever have to open a wall, just to change the ring to the proper depth, resulting in tremendous time and cost savings.

BRIEF DESCRIPTION OF THE DRAWINGS

The present invention is illustrated by way of example and not limited in the accompanying figures in which like reference numerals indicate similar elements and in which.

Further, it is to be understood that the drawings may represent the scale of different components of one single embodiment; however, the disclosed embodiments are not limited to that particular scale.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

In general, aspects of this invention relate to a universal ring and stackable plates that may be used with any existing electrical box. According to various aspects and embodiments, the universal ring and stackable plates described herein may be formed of one or more of a variety of materials, such as metals, metal alloys, polymers, and composites, depending on the desired application and the local building codes for that application, without departing from the scope of the invention.

Additionally, the components of the invention may be formed by various forming methods. For example, metal components, may be formed by forging, fabricating, welding, molding, casting, stamping, machining, and/or other known techniques. Additionally, polymer components, such as elastomers, can be manufactured by polymer processing techniques, such as various molding and casting techniques and/or other known techniques.

The various figures in this application illustrate examples of a universal ring and stackable plates that may be used with existing electrical boxes according to this invention. When the same reference number appears in more than one drawing, that reference number is used consistently in this specification and the drawings refer to the same or similar parts throughout.

Figure 1:
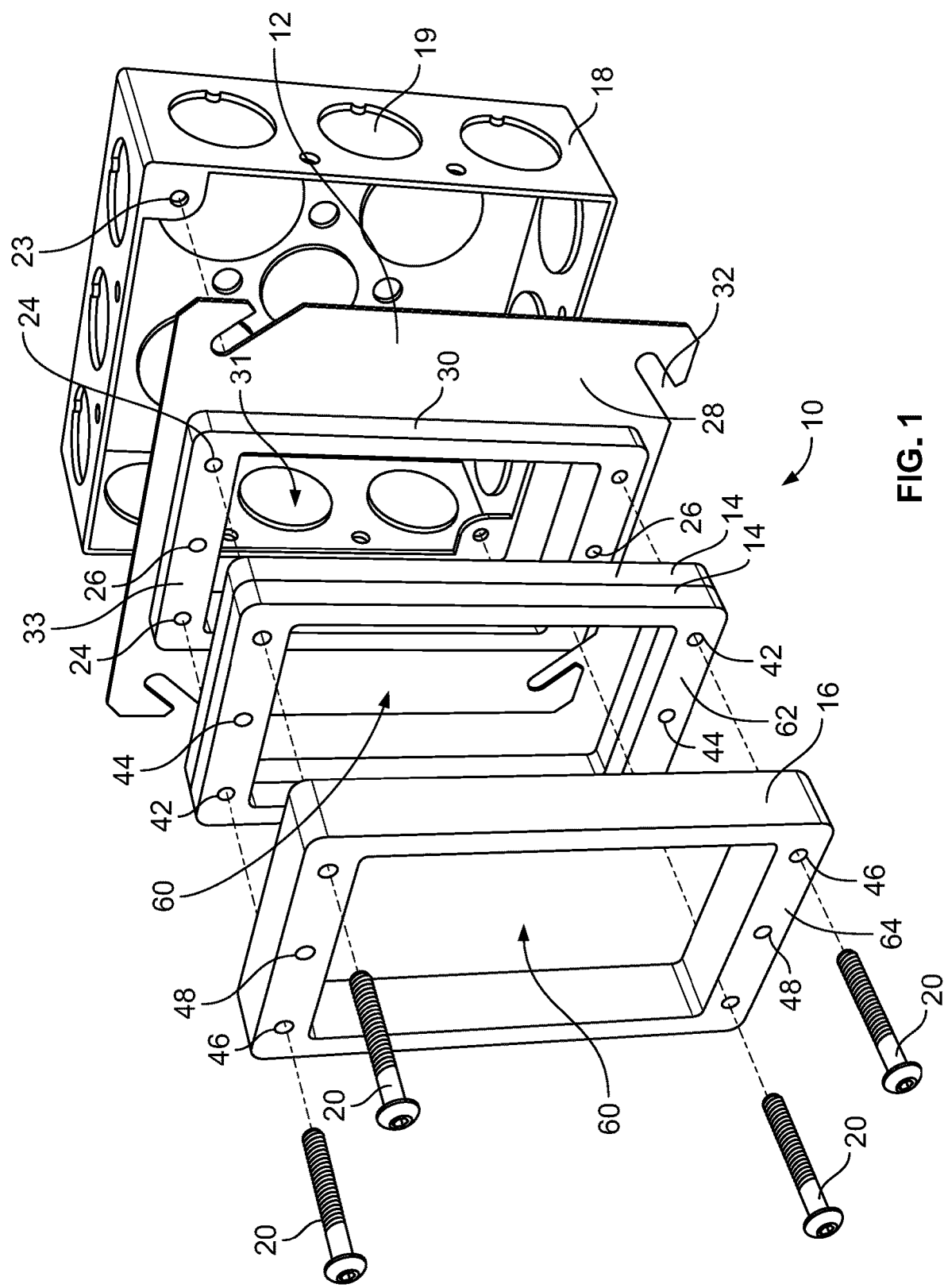
FIG. 1 is an exploded perspective view of an exemplary universal ring and stackable plates with an exemplary electrical box according to one or more aspects described herein.

As will be described in greater detail below, this application illustrates examples of a universal ring and stackable plates assembly all of which may be mounted to an existing electrical or utility box. An exemplary universal ring and stackable plates assembly 10 is shown in FIG. 1 in an exploded view. As described herein, in embodiments, the universal ring and stackable plates assembly 10 generally includes a universal ring 12, one or more stackable plates 14, 16 all of which are mountable to an exemplary box 18. The box 18 is merely exemplary and may include any known electrical box or switch box used with home or commercial building construction. The box 18 may be a single box or a multiple (gang) box, depending on the particular application. The box may define many different shapes including the exemplary rectangular shape depicted in FIG. 1. As should be understood, the aspects of the invention are not limited to use with a particular electrical, switch or utility box but may be used with any shape, style, brand or model of electrical, switch or utility box.

In one embodiment, the box 18 may define a square or rectangular shape forming four walls and a back surface, as shown in FIG. 1. The box 18 may define one or more threaded holes 23 that can be sized to receive a fastener 20 which is used to mount the exemplary universal ring 12 to the box 18. The box may define a plurality of break-away tabs 19 that are used to mount conduit to the box or to allow the conduit to pass into the interior of the box. The use and mounting of conduit, which may carry electrical wiring, coaxial, phone or Cat 5 cables, to an electrical box is known to one of skill in the art and therefore will not be further described.

The exemplary universal ring 12 may define a planar plate 28 further defining a plurality of slots 32 formed in the corners of the planar plate. As depicted in FIG. 1, the plurality of slots are used to mount the ring 12 to the box 18 through the use of one or more fasteners 22 that mate with the threaded holes 23 of the box 18. The slots 32 are sized and shaped to permit the ring 12 to easily slide around the fasteners 22 for quick installation of the ring 12. The head of the fasteners 22 are larger than the width of the slots to capture the planar plate portion 28 of the ring between the fastener head and the outer perimeter edge of the box 18. To remove the ring, the fasteners may be loosened and the planar plate portion 28 upon a small rotation of the planar plate will slide out from under the head of the fasteners. Alternatively, to remove the ring 12 from the box, the plurality of fasteners 22 can be threadably removed from the box and the ring 12 may be lifted away from the box 18. Other techniques for mounting the ring 12 to the box 18 may be employed.

The planar plate 28 may define a rectangular shape, as depicted in the figures. In an exemplary aspect, each side of the plate may be approximately 4 and ⅛ inches in length. Other lengths of the sides of the plate are possible depending on the desired application and the size of the box to which the ring 12 is mounted.

Extending outwardly from the planar plate 28 is a ring portion 30. The ring portion 30 defines an open center 31 through which will pass electrical wiring or cabling that will connect to an electrical device, such as switch, cable connector or electrical outlet, which is mounted to the outermost plate 14, 16, as described in further detail below.

Figure 2:
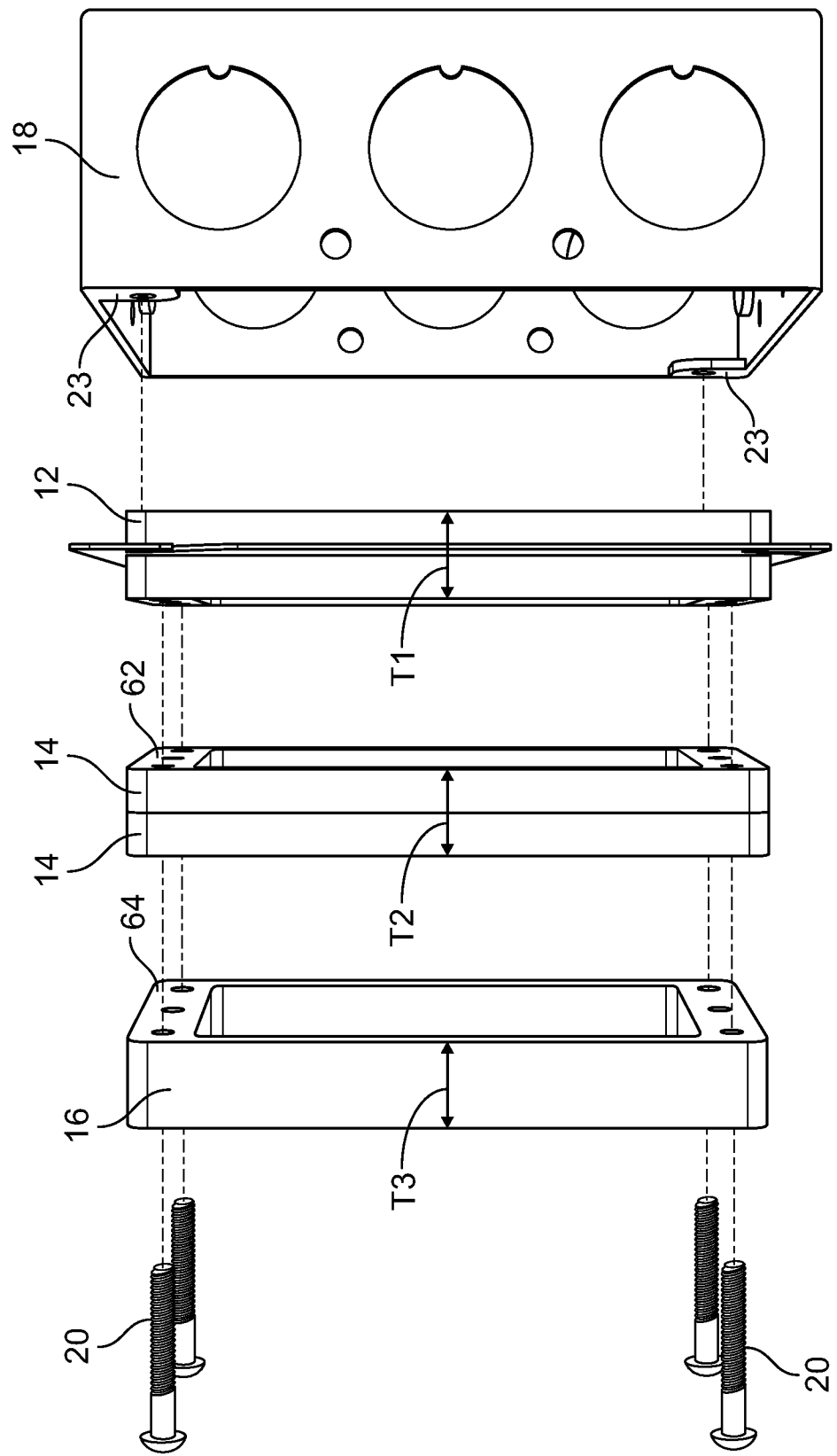
FIG. 2 is an exploded side view of the exemplary universal ring and stackable plates assembly of FIG. 1.
Figure 3:
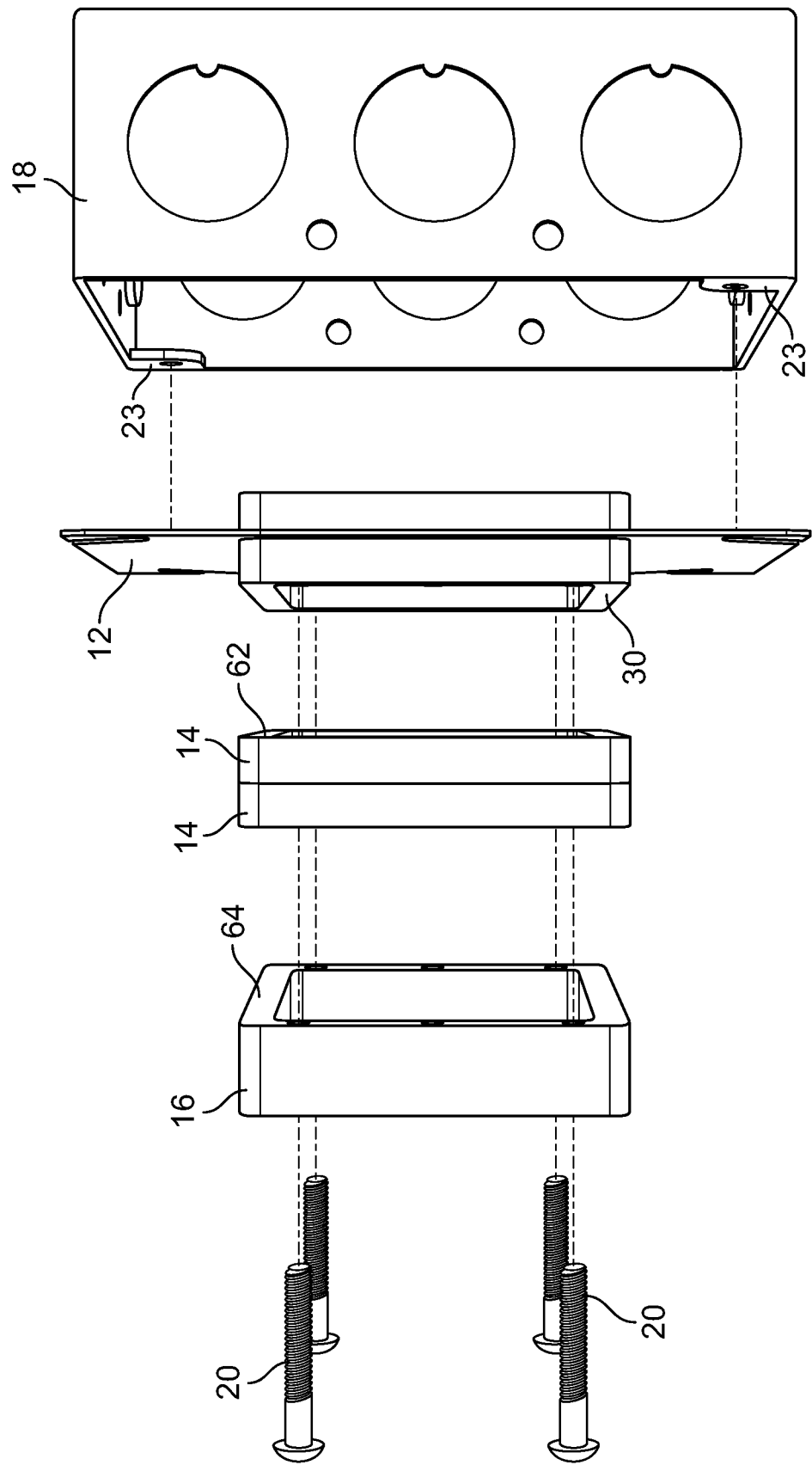
FIG. 3 is an exploded top view of the exemplary universal ring and stackable plates assembly of FIG. 1.

The ring portion 30 defines an outermost planar portion 33 that is substantially parallel to the planar plate portion 28. In effect, the outermost planar portion 33 defines a surface that is raised a certain distance from the planar plate portion 28. Referring to FIG. 2, this distance (or thickness of the ring extending outwardly from the planar plate portion 28), identified as T1, may be any desirable distance. In one embodiment, this distance T1 (i.e., ring thickness) may be ½ inch. In another exemplary embodiment, this distance may be ⅝ inch. These two measurements match the known thicknesses of common drywall used in wall construction. In yet other embodiments, the distance may be any other measurement ranging from ¼ inches up to 2 inches. In still other embodiments, the distance (i.e., ring depth) may be less than ¼ inches or greater than 2 inches.

Figure 5:
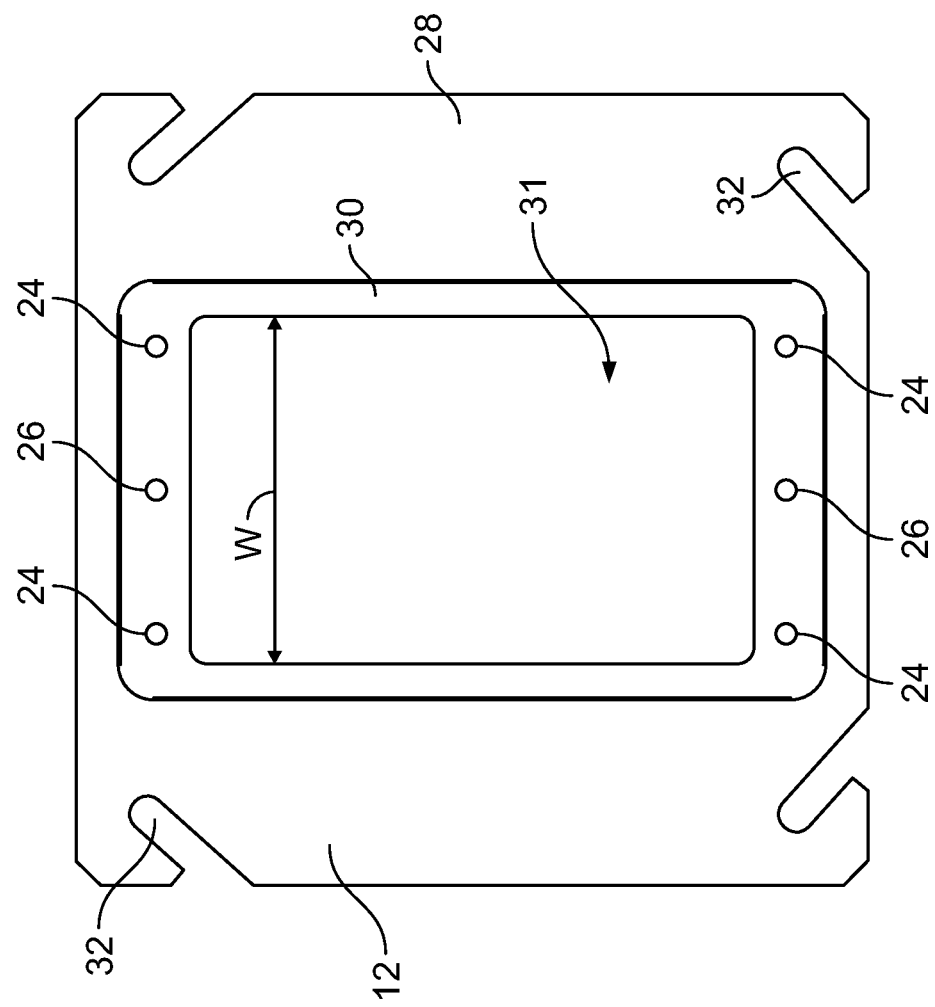
FIG. 5 is a top plan view of an exemplary universal ring according to one embodiment of the invention.

In an exemplary embodiment, the ring portion 30 may define a width of approximately 2.1875 inches and the open center 31 may define a width W of approximately of 1.8125 inches, as shown in FIG. 5. Other widths of the ring and the open center are possible with the teachings of the invention. For example, if a multiple gang box is used, the open center may define dimensions that are one, two or three times the exemplary dimensions, or may be other dimensions. Alternatively, the open center 31 may define multiple openings. As an exemplary embodiment, the ring portion 30 may define two, three, four or more open centers 31, depending on the desired application, each receiving zero, one, two or more stackable plates depending on the wall thickness.

In an exemplary embodiment, the outermost planar portion 33 of the ring portion 30 may be substantially flat and parallel to the planar plate portion 28 so that it is raised a certain distance from the planar plate portion 28. The ring portion 30 may be of a substantially solid material throughout the thickness. Located at several locations on the planar portion 33 of the ring portion 30 are threaded or tapped holes 24. The threaded holes 24 are threaded a sufficient depth to permit the mounting of the stackable plates 14, 16 to the ring portion 30 through the use of one or more fasteners 20. The fasteners 20 pass through holes 42, 46 in the stackable plates and securely thread into the holes 24, thereby securing the stackable plates to the ring portion 30 of the universal ring 12.

The diameter and depth of the threaded holes 24 may vary depending on the desired application. In an exemplary embodiment, four holes 24 are located on the ring portion—two on the top part and two on the bottom part of the ring portion. More or less than four holes 24 can be used with the invention. In an alternative aspect, two, four, six, eight or more holes may be formed in the ring portion 30, depending on the desired application.

Also located on the top and bottom portions of the ring portion are threaded or tapped holes 26. In one exemplary embodiment, one threaded hole 26 is located on the top portion of the ring portion, and one threaded hole 26 is located on the bottom portion of the ring portion. The threaded holes 26 are threaded a sufficient depth to permit the mounting of a switch, electrical outlet or any other known electrical or mechanical device to the universal ring 12 through the use of fasteners, not shown but understood in the art. As explained in further detail below, each stackable plate 14, 16 includes a hole 44, 48, respectively, for permitting the fastener to pass through and to mount to the threaded holes 26. The length of the fastener may vary depending on the number of stackable plates 14, 16 used with the particular wall application. In an exemplary embodiment, two holes 26 are located on the ring portion. In alternative embodiments, more or less than two holes 26 can be used with the invention.

In an exemplary aspect, the ring portion may also extend outwardly from the opposite or rear surface of the planar portion, as depicted in FIG. 2. This portion of the ring will extend into the box 18 to which it is mounted. This portion provides additional thickness and strength to the ring portion and to permit the holes 24, 26 to be tapped to a greater depth, to thereby further secure the plates 14, 16, described below, to the universal ring 12.

In another exemplary aspect of the invention, one or more stackable plates 14, 16 may be mounted to the universal ring 12 and stacked one on top of the other and then secured to the universal ring, as described above, to achieve a desired stacked thickness. The desired stacked thickness accommodates the particular finished wall thickness, even after the drywall, tile, stone or other wall materials have been installed. Significantly, the stackable plates 14, 16 may be stacked together and then mounted to the ring portion 30 of the universal ring 12 without having to remove any drywall, tile, stone or other material that has already been installed to the wall. This permits the builder or contractor to simply mount the universal ring 12 to the box 18 knowing that he will be able to accommodate any finished wall thickness by stacking and mounting the plates 14, 16 to the universal ring 12 without ever having to remove or cut-away any of the finished wall. This unique aspect of the invention overcomes this and other known problems in the industry.

In an exemplary aspect, as shown in FIG. 2, the stackable plate 14 may be made in a number of different thicknesses, identified as T2, including ⅛, ¼ and ½ inch thickness. In the embodiment shown in FIG. 2, the thickness T2 is preferably ¼ inch. Similarly, the stackable plate 16 may be made in a number of different thicknesses, identified as T3, including ⅛, ¼ and ½ inch thickness. In the embodiment shown in FIG. 2, the thickness T3 is preferably ½ inch. Each of these plates may be stacked in any combination to achieve the desired stacked thickness. In an alternative aspect, the thicknesses of the plates 14, 16 may define other thicknesses, including thicknesses less than ⅛ inch and greater than ½ inch. Alternatively, the thicknesses of the plates 14, 16 may be in 1/16 inch increments.

As depicted in FIG. 1, the shape, profile and overall configuration of the stackable plates 14, 16 may match the shape, profile and overall configuration of the ring portion 30 of the universal ring 12. In an alternative aspect, the shape, profile and overall configuration of the plates 14, 16 may differ from the ring portion 30. In one aspect of the invention, the plates 14, 16 define planar surfaces 62, 64, respectively, on both sides of each plate. The planar surfaces 62 on plate 14 may be substantially parallel to each other. Similarly, the planar surfaces 64 on plate 16 may be substantially parallel to each other. The planar surfaces 62, 64 permit the plates 14, 16 to stack on top of each other and to align and mate with each other. In other words, the planar surfaces 62, 64 allow the plates to uniformly and evenly stack on top of each other with each plate being parallel to the adjoining plate. All of the plates are also parallel and therefore stackable to the planar portion 33 of the ring portion 30 of the universal ring 12. This configuration allows all the plates and universal ring to be square, i.e., perpendicular, with the box 18 to which all of them may be mounted.

Figure 4:
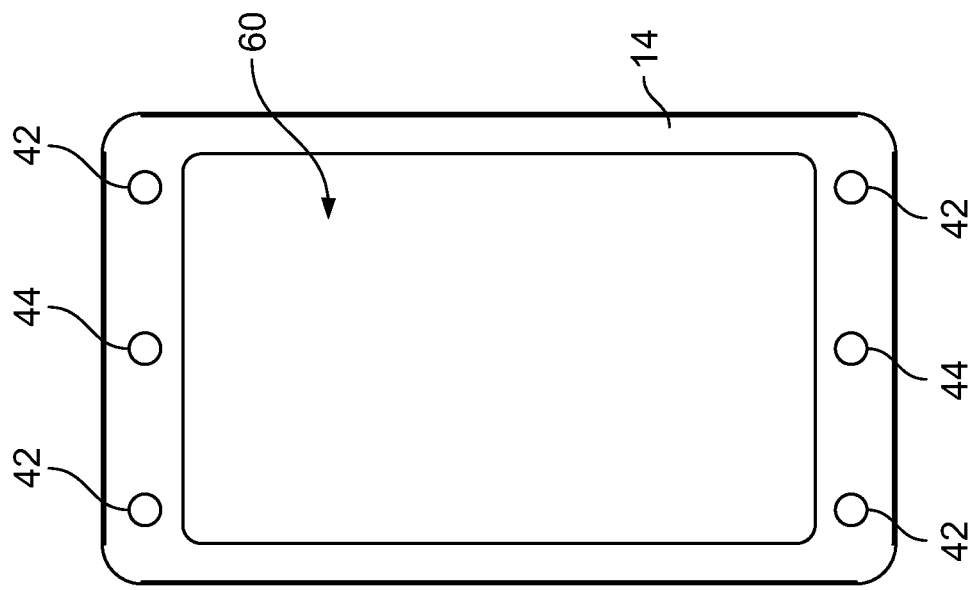
FIG. 4 is a top plan view of an exemplary stackable plate according to one embodiment of the invention.

Each of the plates 14, 16 define an open center 60 through which may pass wiring or cabling that gets mounted to the outlet, switch or other device that is mounted to the plate(s). In one embodiment, the open center 60 defines a shape and configuration that matches the shape and configuration of the open center 31 of the universal ring 12, as shown in FIGS. 4 and 5. This means the dimensions of the open center 60 may be the same as or similar to the dimensions of the open center 31, described above. In an alternative aspect, the open center 60 may define other shapes and configurations and have other dimensions and still be within the scope of the invention. In an alternative embodiment, one or more support structures, such as ribs, fillets, cross-members or the like can be used with each plate to provide additional structural rigidity to the plate. Other techniques to provide further structural support to the plates are possible.

Located at multiple locations on the plate 14 may be holes 42 that permit the passing of fasteners 20 through the holes 42. The holes 42 permit the plate 14 to be mounted to the ring portion 30 of the universal ring 12. Again, as indicated above, the number and location of the holes 42 may vary depending on the desired application. Also located on the plate 14 are holes 44 for receiving the fasteners that are used to mount the switch or electrical outlet to the holes 26 of the universal ring.

Similarly, located at multiple locations on the plate 16 may be holes 46 that permit the passing of the fastener 20 through the holes 46 to mount the plate 16 to the universal ring 12. Again, the number and location of the holes 46 may vary depending on the desired application. Holes 48 may also be located on the plate 16 for receiving the fasteners that are used to mount the switch or electrical outlet to the holes 26 of the universal ring.

In an alternative embodiment, the plates 14, 16 may be interlocked together or clamped or adhesively secured together prior to mounting them to the universal ring 12.

In an alternative aspect, zero, one, two, three or more plates 14, 16 may be mounted to the universal ring depending on the finished wall thickness.

Figure 6:
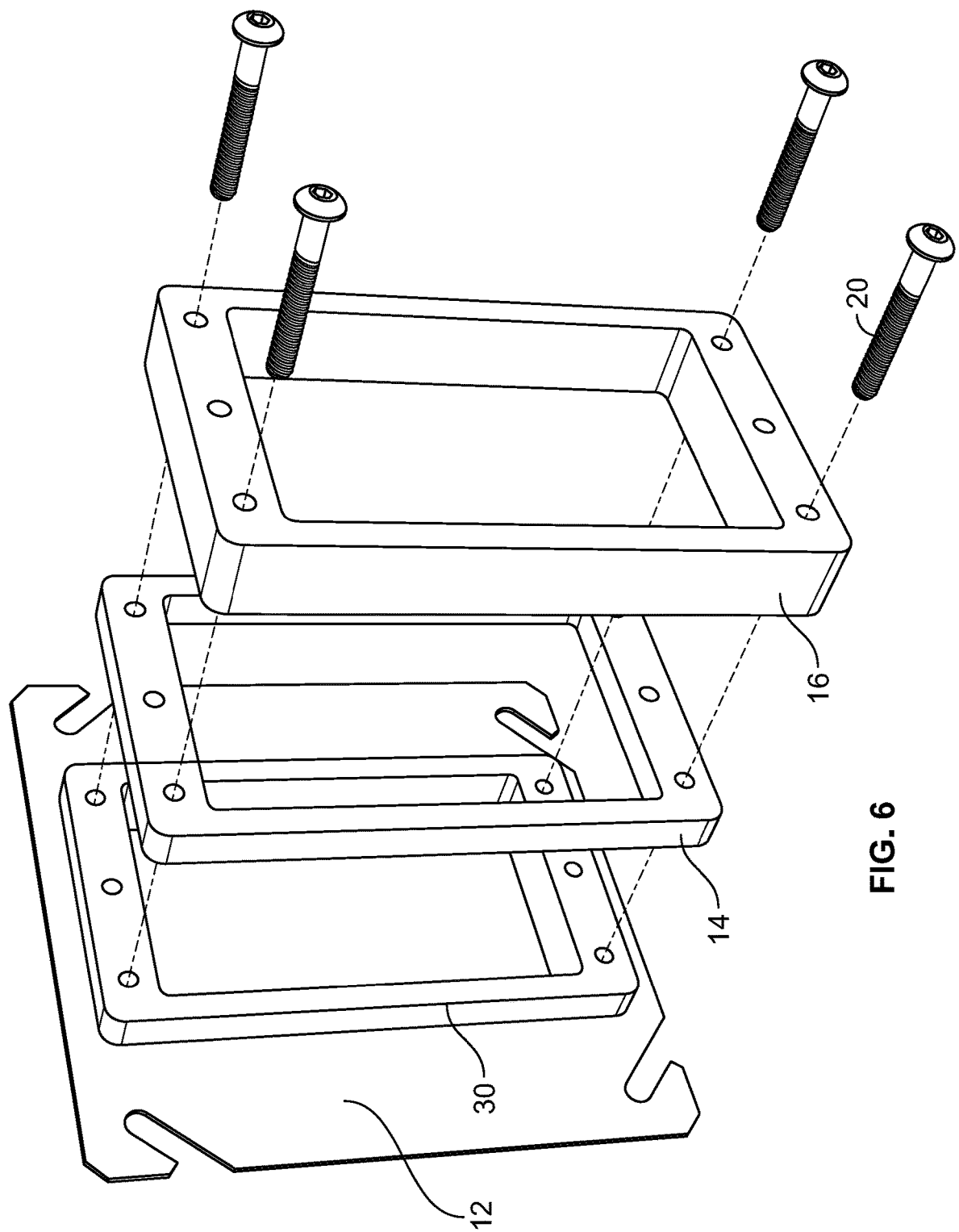
FIG. 6 is an exploded perspective view of an exemplary universal ring and stackable plates according to one or more aspects described herein.
Figure 7:
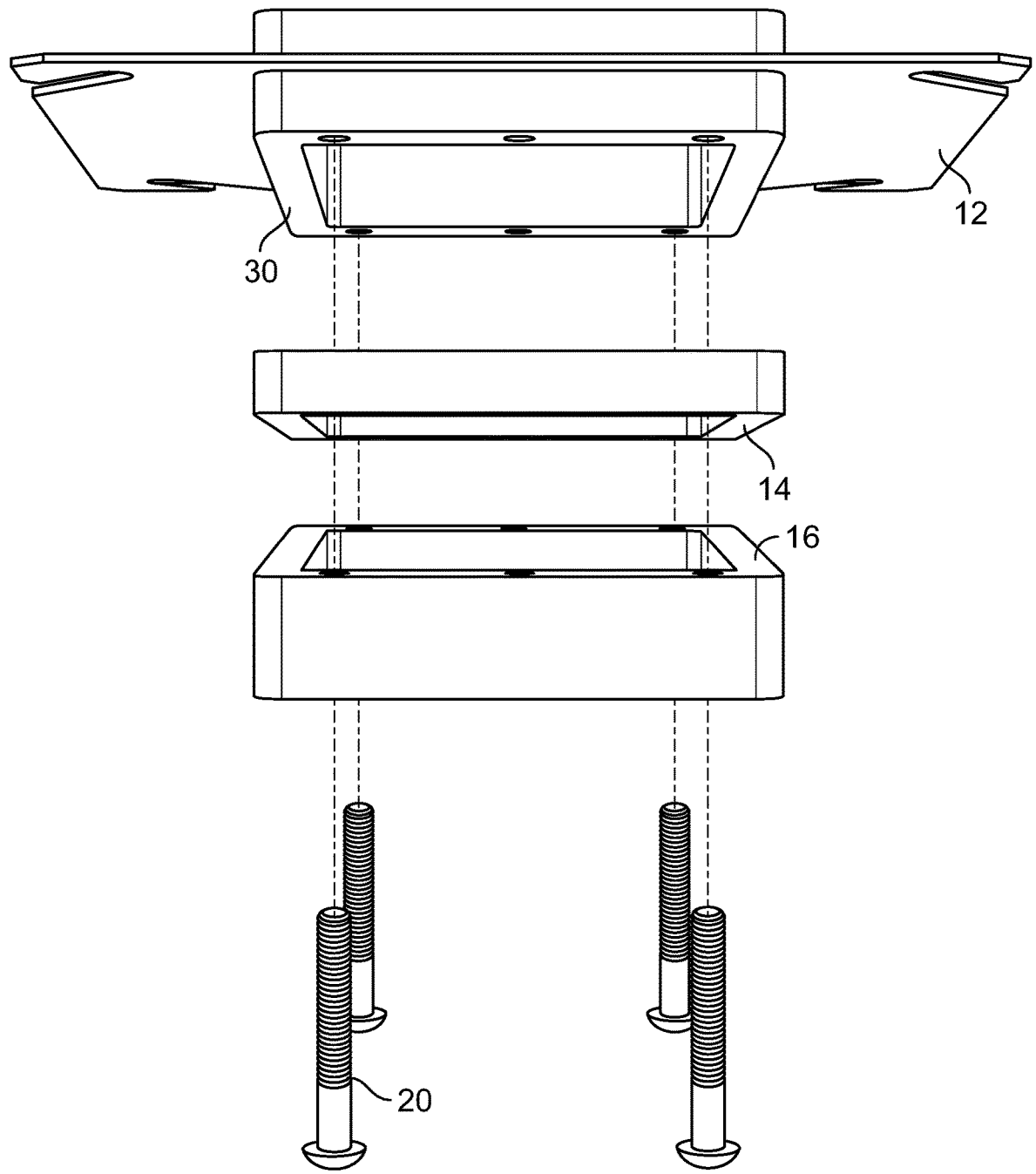
FIG. 7 is an exploded top view of an exemplary universal ring and stackable plates according to one or more aspects described herein.

Referring to FIGS. 6 and 7, the universal ring 12 and stackable plates 14, 16 are depicted and, as explained above, all of these may be mountable to each other through the use of one or more fasteners 20 and also mountable to an electrical or utility box. As indicated earlier, the electrical or utility box may be any known box used with home or commercial building construction. The plates 14, 16 may be any combination of thicknesses to accommodate the finished wall thickness and, significantly, can be added to the universal ring after the finished wall is installed. The plates may a single plate. The plates may be a combination of the same thickness plate. The plates may be a combination of plates having different thicknesses. In other words, depending on the application and finished wall thickness, a single plate may be used or a plurality of plates each having the same or different thicknesses can be used. The plates are easily attachable to and detachable from the universal ring which is mountable to the electrical or utility box. Other ways of connecting the plates to the universal ring are possible and are considered within the scope of the invention.

In an alternative embodiment, the plates can be retrofitted to an existing ring already installed to an electrical box. The plates 14, 16 can be fastened to the existing mounting holes currently used for mounting the electrical switch or outlet. Alternatively, the existing ring can be tapped with one or more threaded holes that will align with the location of the one or more of the holes 42 on the plate 14 or the one or more holes 46 of the plate 16. A fastener can then be used to secure the plate to the tapped hole(s). In yet another alternative embodiment, the plate 14 can be clamped, fastened, welded or adhesively secured to the existing ring. In still yet another alternative embodiment, a backing plate may be located on the opposite side (or rear side) of the existing ring and then the plate 14 can be secured to the backing plate, using techniques described herein. The existing ring will effectively be clamped between the backing plate and the plate 14.

In another alternative embodiment, the plates 14, 16 can be retrofitted to an existing switch box 78 (FIG. 8) that does not require the use of a ring. The plates 14, 16 can be stacked on each other and then fastened to the switch box using existing mounting holes located on the switch box or fastened to threaded holes that are tapped into the switch box. These tapped holes may be aligned with the location of one or more of the holes 42 on the plate 14 or one or more holes 46 on the plate 16. A fastener can then be used to secure the plate(s) to the tapped hole(s) on the switch box.

In one embodiment, the invention may be used with a switch box wherein the switch box defines a box housing that further defines an outer surface and a plurality of mounting holes. One or more plates 14, 16 may be mounted to the plurality of mounting holes of the box housing. The one or more plates may define opposing planar surfaces, and may be stackable on the outer surface of the box housing. The one or more plates 14, 16 may further define an open plate center and the opposing planar surfaces may define a plurality of holes. When the one or more plates are stacked on the outer surface of the box housing, the plurality of holes in the opposing planar surfaces are aligned with the plurality of mounting holes in the outer surface of the box housing to receive a fastener for securing the one or more plates to the outer surface of the box. In an alternative aspect, the one or more plates include a first plate 14 having a first thickness, and a second plate 16 having a second thickness. In an embodiment, the first thickness may be any of ⅛, ¼ and ½ inch thickness. Similarly, the second thickness may be any of ⅛, ¼ and ½ inch thickness. Alternatively, other thicknesses of the plates 14, 16 may be used.

Figure 8:
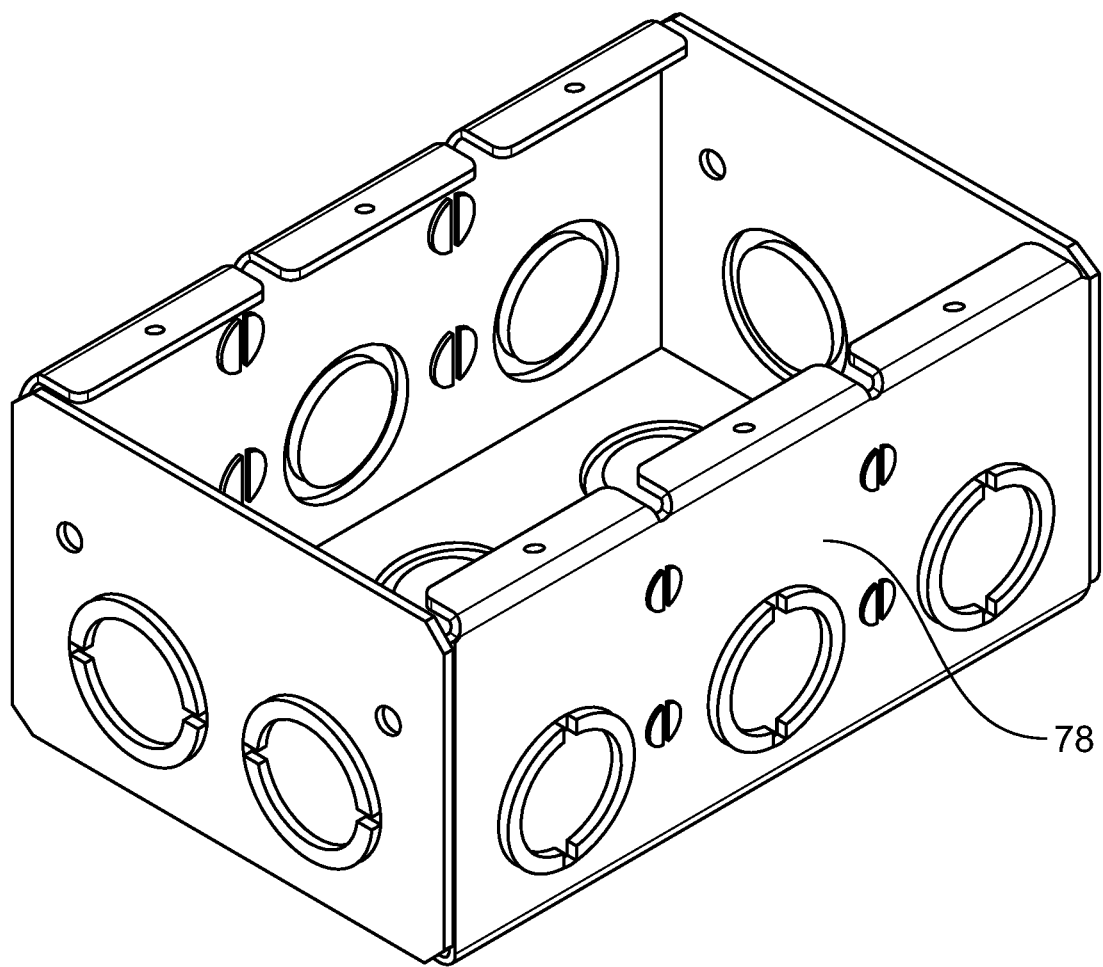
FIG. 8 is an isometric view of a prior art switch box.
Figure 9:
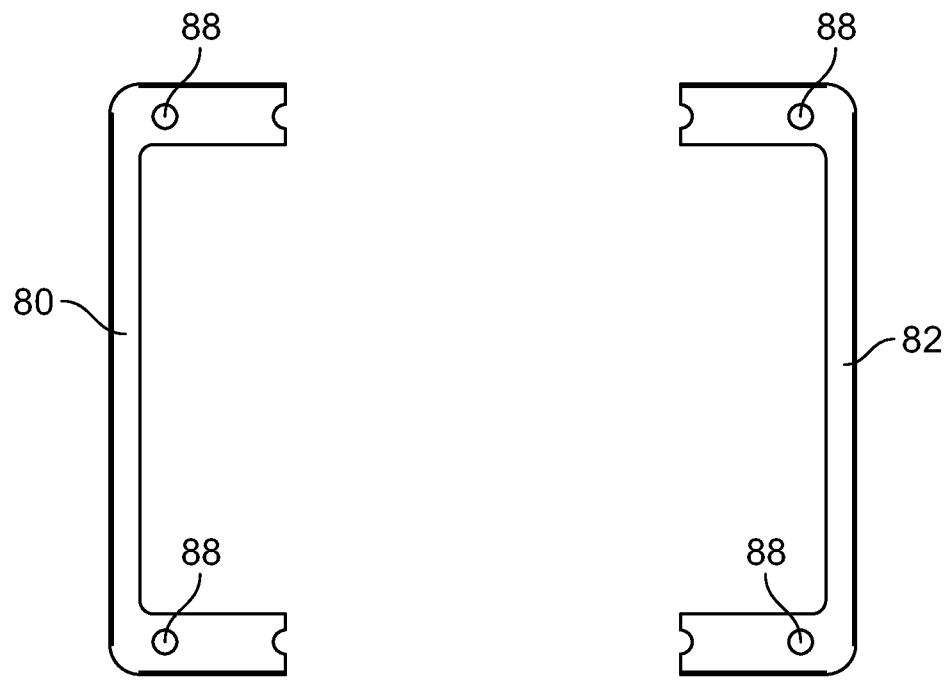
FIG. 9 is a top plan view of exemplary split plates according to one or more aspects described herein.
Figure 10:
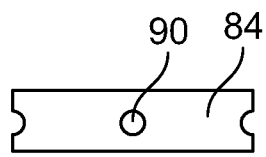
FIG. 10 is a top plan view of exemplary spacer plate according to one or more aspects described herein.
Figure 11:
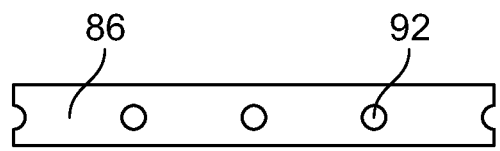
FIG. 11 is a top plan view of exemplary spacer plate of a greater length according to one or more aspects described herein.
Figure 12:
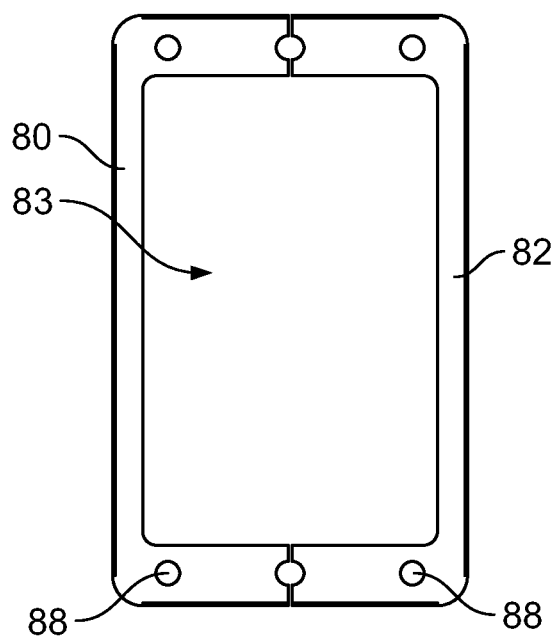
FIG. 12 is a top plan view of the exemplary split plates of FIG. 9.

In another alternative embodiment, and referring to FIGS. 9-15, split plates 80, 82 may be used with an existing switch box (such as the switch box 78 shown in FIG. 8). The split plates 80, 82 may be mounted directly to the switch box housing. As shown in FIG. 12, the split plates 80, 82 can define left and right plates that may be aligned such that they face each other to form a ring for a single gang box. The split plates 80, 82 define a plurality of openings 88 for receiving one or more fasteners to mount the plates 80, 82 to tapped holes in the switch box housing. The split plates when joined and facing each other define an open plate center 83 to permit the wiring for the mounted switch to pass from the switch box to the switch (not shown). The split plates may define a thickness of any of ⅛, ¼ and ½ inch thickness, or may define other thicknesses. In an exemplary aspect, multiple split extension plates of either the same or different thickness may be stacked on to each other to define a greater plate thickness.

Figure 13:
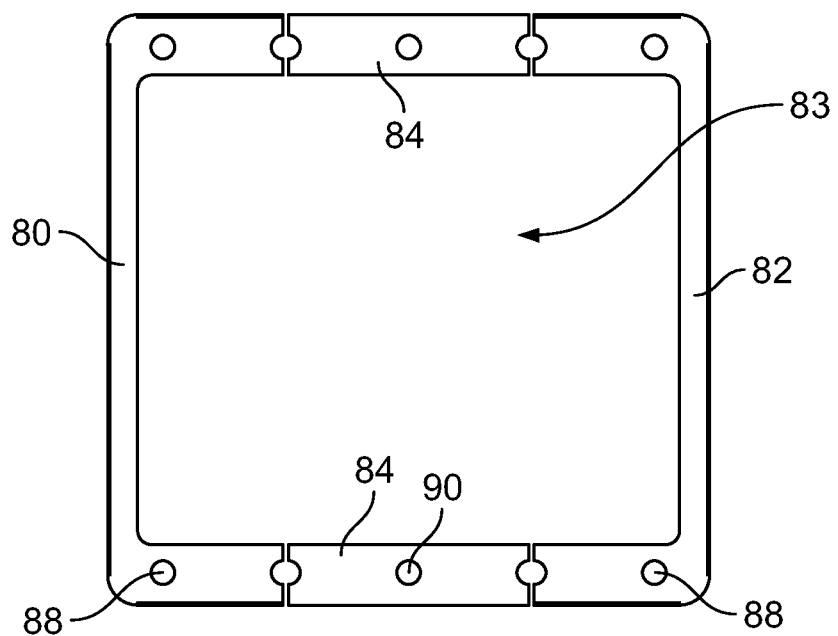
FIG. 13 is a top plan view of the exemplary split plates combined with an exemplary spacer plate according to one or more aspects described herein.

Referring to FIGS. 10 and 13, if a two gang box is used, the split extension plates 80, 82 may be used along with a top and bottom plate spacer 84. The plate spacers 84 separate the lateral distance (i.e., spacing) between the plates 80, 82, as shown in FIG. 13. This assembly when mounted to the switch box can then accommodate two separate gang boxes which can be mounted to the openings 88 and 90. The plate spacers 84 may define a thickness of any of ⅛, ¼ and ½ inch thickness, similar to the split plates 80, 82, or may define other thicknesses. Also, the plates 80, 82 and spacers 84 can be stacked on to each other to define a greater plate thickness.

Figure 14:
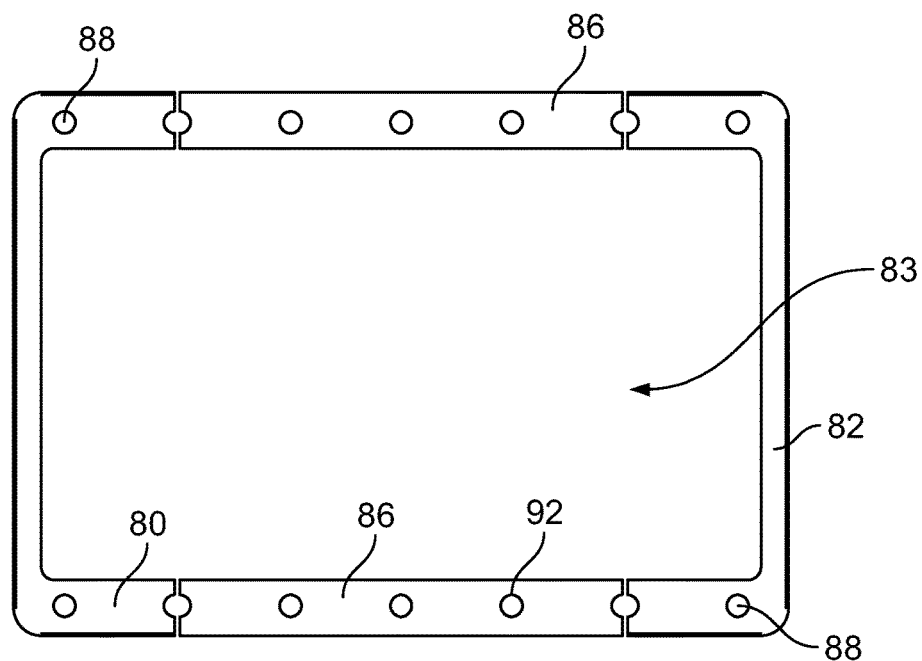
FIG. 14 is a top plan view of the exemplary split plates combined with an exemplary spacer plate according to one or more aspects described herein.

Referring to FIGS. 11 and 14, if a three gang box is used, the split extension plates 80, 82 may be used along with a top and bottom plate spacer 86, which is longer than plate spacer 84. The plate spacers 86 separate the lateral distance (i.e., spacing) between the plates 80, 82, as shown in FIG. 14, to accommodate three separate gang boxes which can be mounted to the openings 88 and 92. The plate spacers 86 may define a thickness of any of ⅛, ¼ and ½ inch thickness, similar to the split plates 80, 82, or may define other thicknesses. Also, the plates 80, 82 and spacers 86 can be stacked on to each other to define a greater plate thickness.

Figure 15:
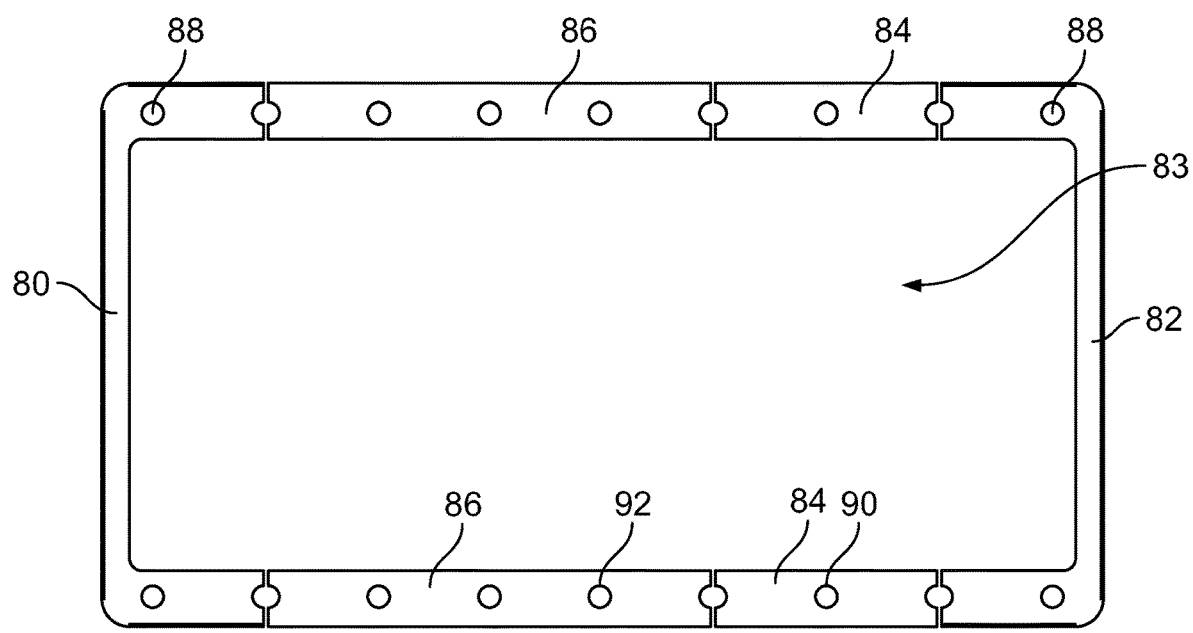
FIG. 15 is a top plan view of the exemplary split plates combined with exemplary spacer plates according to one or more aspects described herein.

In another embodiment, and referring to FIG. 15, if a four gang box is used, the split extension plates 80, 82 may be used along with a top and bottom plate spacers 84 and 86. The plate spacers 84 and 86 are aligned end to end with each other and are positioned between the plates 80, 82 to increase the lateral distance (i.e., spacing) between the plates 80, 82, as shown in FIG. 15, to accommodate four separate gang boxes which can be mounted to the openings 88, 90 and 92. As with the other embodiments, the split plates 80, 82 and plate spacers 84 and 86 may define a thickness of any of ⅛, ¼ and ½ inch thickness, or may define other thicknesses. Also, the plates and spacers can be stacked on to each other to define a greater plate thickness.

In an alternative aspect, the split plates 80, 82 and spacers 84, 86 may be used with and mounted to the universal ring 12. Alternatively, the split plates 80, 82 and spacers 84, 86, if used, can be mounted directly to the switch box or electrical box housings, and also stacked on top of each other depending on the desired thickness.

Figure 16:
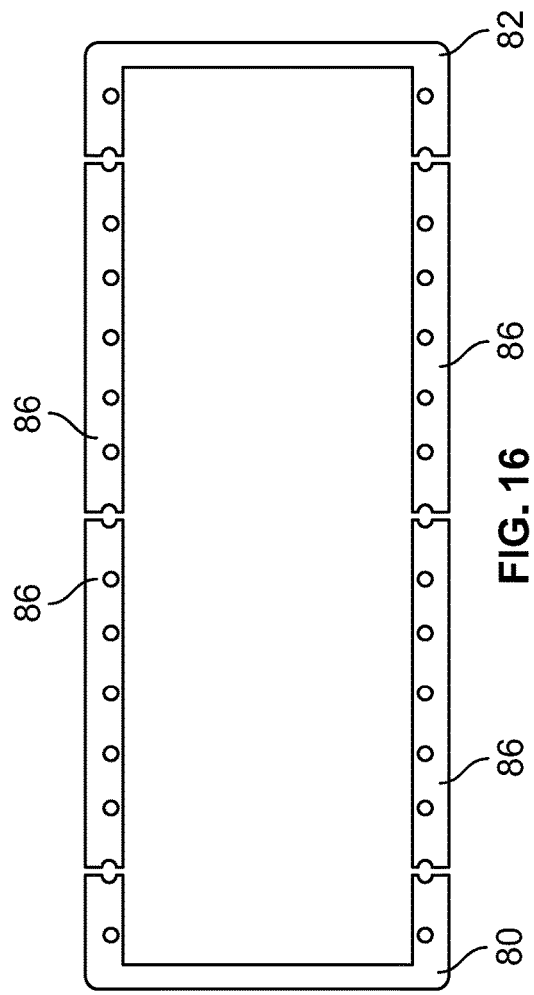
FIG. 16 is a top plan view of the exemplary split plates combined with exemplary spacer plates according to one or more aspects described herein.

In another embodiment, and referring to FIG. 16, if a five gang box is used, the split plates 80, 82 may be used along with plate spacers 86. The plate spacers 86 are aligned end to end with each other and are positioned between the plates 80, 82 to increase the lateral distance (i.e., spacing) between the plates 80, 82, as shown in FIG. 16, to accommodate five separate gang boxes which can be mounted to the openings 88 and 92. As with the other embodiments, the split plates 80, 82 and plate spacers 86 may define a thickness of any of ⅛, ¼ and ½-inch thickness, or may define other thicknesses. Also, the plates and spacers can be stacked on to each other to define a greater plate thickness.

In an alternative aspect, the split plates 80, 82 and spacers 86 may be used with and mounted to the universal ring 12. Alternatively, the split plates 80, 82 and spacers 86, if used, can be mounted directly to the switch box or electrical box housings, and also stacked on top of each other depending on the desired thickness.

Figure 17:
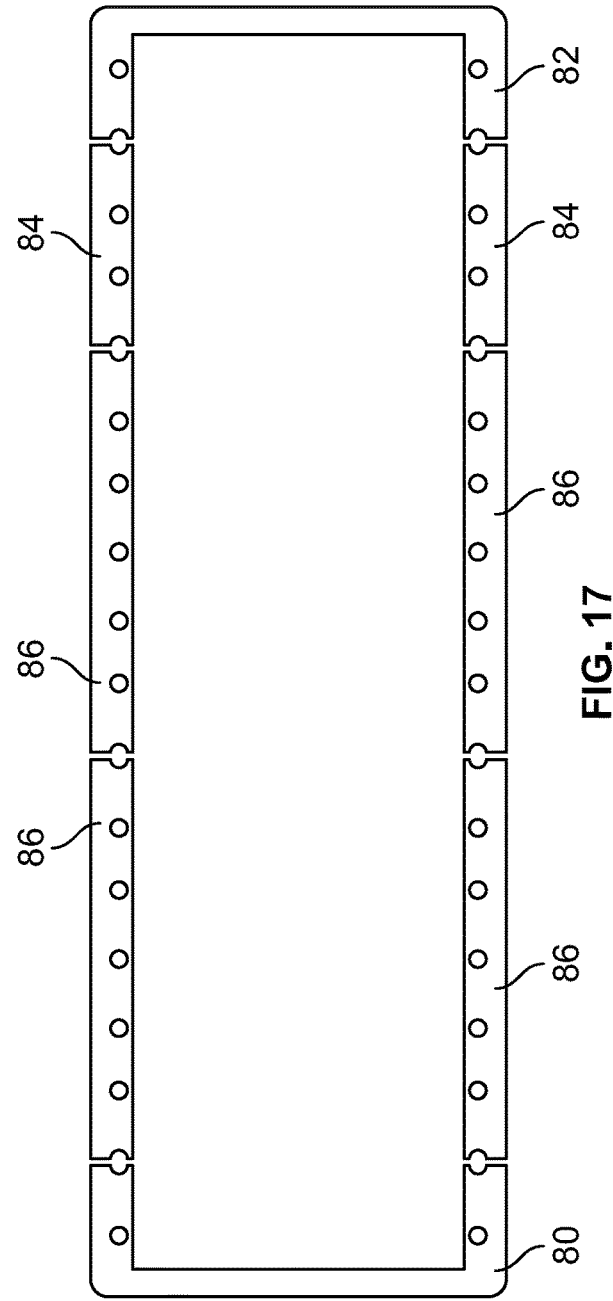
FIG. 17 is a top plan view of the exemplary split plates combined with exemplary spacer plates according to one or more aspects described herein.

In another embodiment, and referring to FIG. 17, if a six gang box is used, the split plates 80, 82 may be used along with plate spacers 84 and 86. In this embodiment, two plate spacers 86 and one spacer plate 84 are aligned end to end with each other and are positioned between the plates 80, 82 to increase the lateral distance (i.e., spacing) between the plates 80, 82, as shown in FIG. 17, to accommodate six separate gang boxes which can be mounted to the openings 88, 90 and 92. Again, as with the other embodiments, the split plates 80, 82 and plate spacers 84 and 86 may define a thickness of any of ⅛, ¼ and ½ inch thickness, or may define other thicknesses. Also, the plates and spacers can be stacked on to each other to define a greater plate thickness.

Like the other embodiments, the split plates 80, 82 and spacers 84, 86 may be used with and mounted to the universal ring 12. Alternatively, the split plates 80, 82 and spacers 84, 86, if used, can be mounted directly to the switch box or electrical box housings, and also stacked on top of each other depending on the desired thickness.

Figure 18:
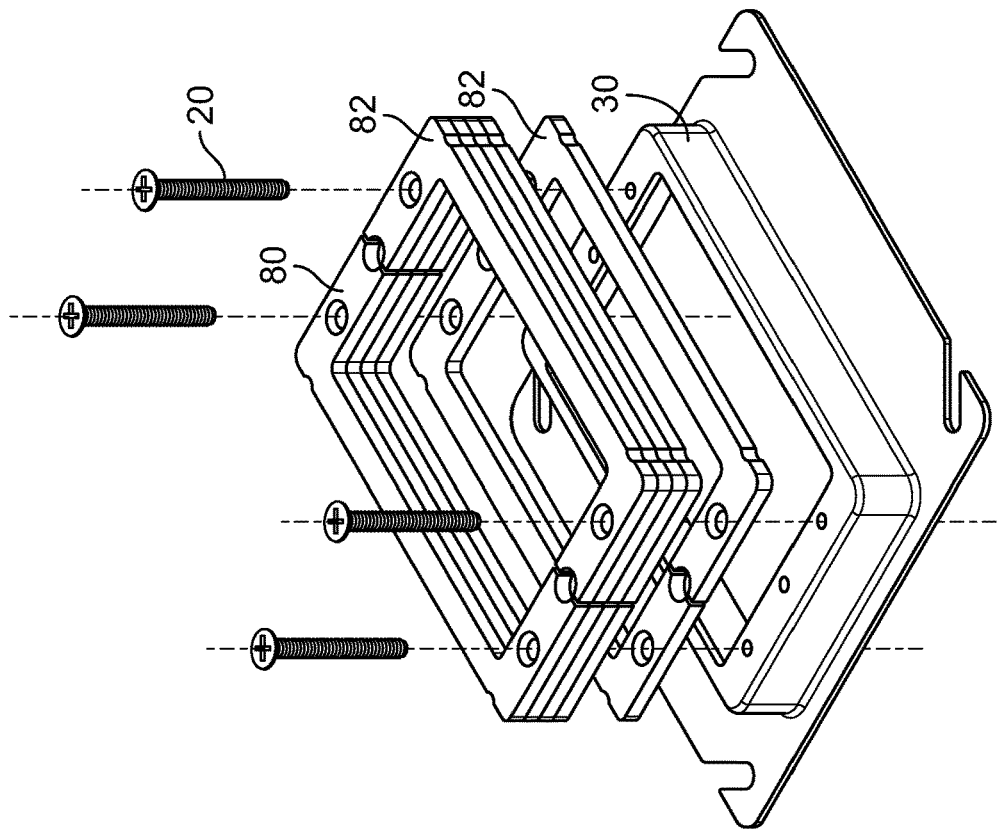
FIG. 18 is an exploded perspective view of exemplary stackable split plates according to one embodiment of the invention.

Referring to FIG. 18, the exemplary split plates 80, 82 may be stacked to each other and mounted to a ring. The split plates 80, 82 may define a thickness of any of ⅛, ¼ and ½-inch thickness, or may define other thicknesses. The plates are secured to the ring through the use of fasteners 20.

Figure 19:
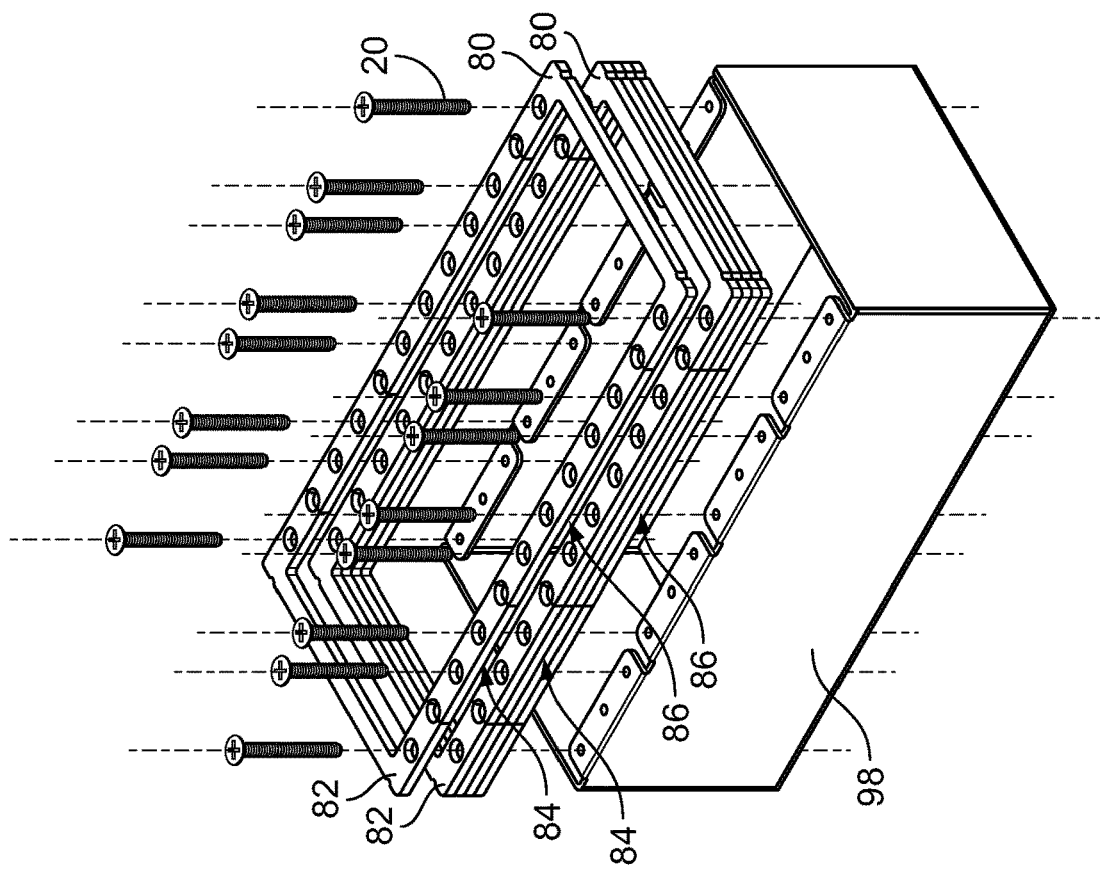
FIG. 19 is an exploded perspective view of exemplary stackable split plates mounted to a box according to one embodiment of the invention.

Referring to FIG. 19 the exemplary split plates 80, 82 and spacers 84, 86 may be stacked to each other and mounted to a utility box 98 that is designed and configured with spaced mounting holes to match the location of the mounting holes in the split plates and spacers. The split plates 80, 82 and spacers 84, 86 may define a thickness of any of ⅛, ¼ and ½-inch thickness, or may define other thicknesses. The plates are secured to the utility box 98 through the use of fasteners 20.

Figure 21:
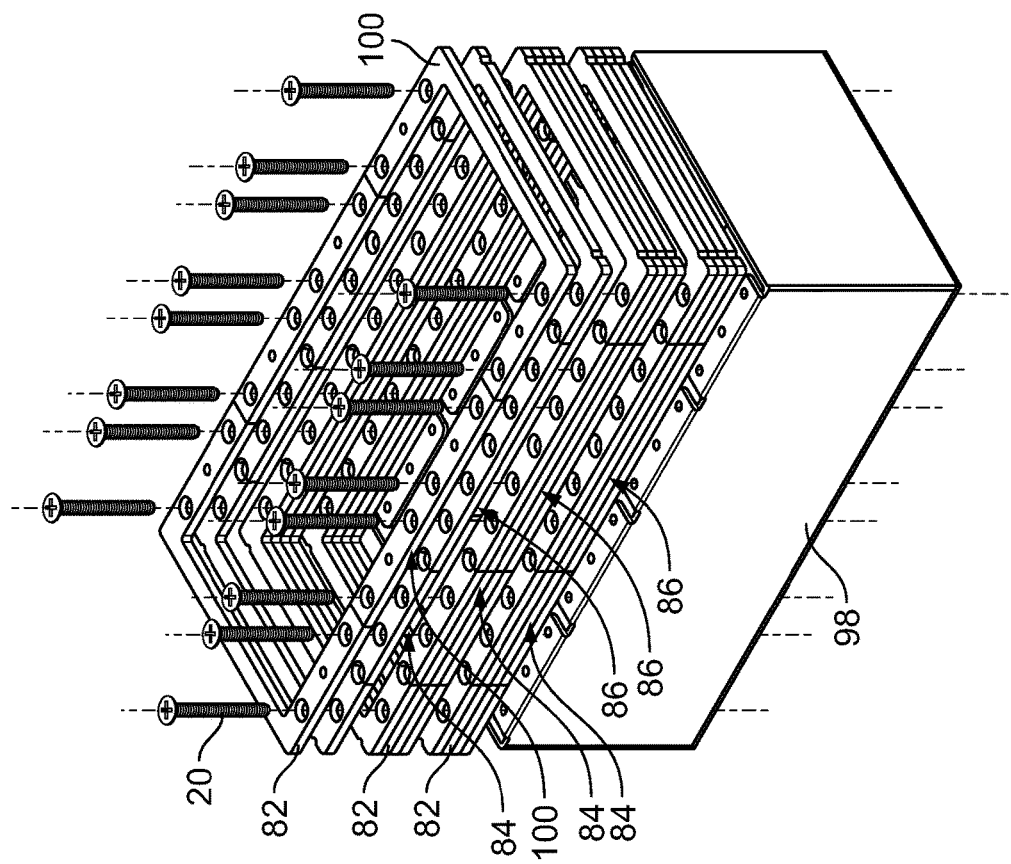
FIG. 21 is an exploded perspective view of exemplary stackable split plates with a lock layer mounted to a box according to one embodiment of the invention.
Figure 20:
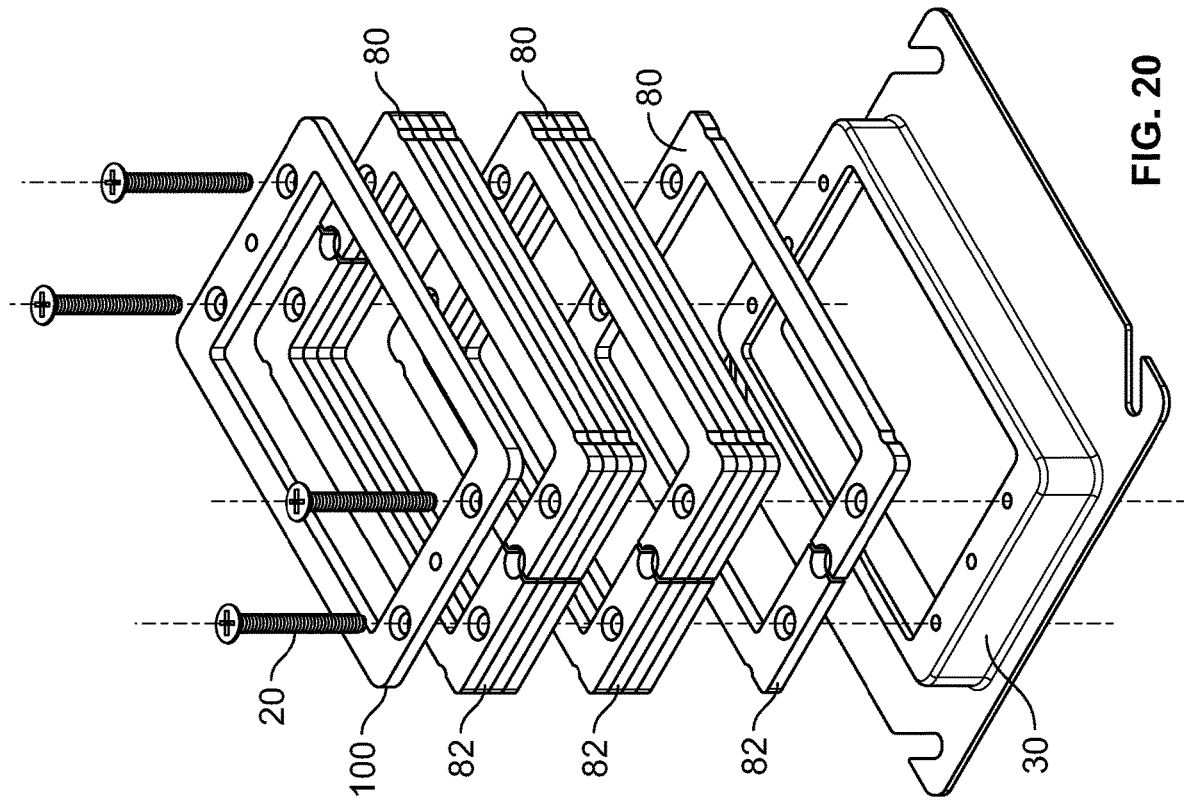
FIG. 20 is an exploded perspective view of exemplary stackable split plates with a lock layer according to one embodiment of the invention.

In another exemplary aspect, as shown in FIGS. 20 and 21, one or more locking rings 100 or ring segments that form a locking layer may be used to further secure together the stackable split plates 80, 82 and spacers 84, 86. The locking layer formed by the locking ring provides additional structural integrity to the stacked split plates and spacers by being mounted on top of the seams where two plates or spacers come together and fastened to the plates and spacers. In other words, the locking ring 100 bridges the gap formed by the adjoining plates and spacers and is also fastened to the adjoining plates and spacers. The locking rings 100 may define a number of different thicknesses, including ⅛, ¼ and ½-inch thickness. In an alternative aspect, the thicknesses of the locking rings 100 may define other thicknesses, including thicknesses less than ⅛ inch and greater than ½ inch. Each of these locking rings 100 or ring segments may be stacked to the stackable split plates and spacers in any combination to achieve the desired stacked thickness and to secure the stacked split plates and spacers together.

As depicted, the shape, profile and overall configuration of the locking rings 100 may match the shape, profile and overall configuration of the split plates and spacers and the ring portion 30 of the universal ring. In an alternative aspect, the shape, profile and overall configuration of the locking rings 100 may differ from the split plates and spacers and ring portion. In one aspect of the invention, the locking rings 100 define planar surfaces on both sides of the ring. The planar surfaces on the locking rings 100 may be substantially parallel to each other. The planar surfaces permit the locking rings 100 to stack on the split plates and spacers or the ring portion and to align and mate with each other. Once stacked on and fastened to the plates and spacers or ring portion, the locking rings 100 further secure the plates and spacers together and to the ring portion or to the utility box. This configuration also allows all the plates, spacers, and ring portion to be square with the box to which all of them may be mounted.

In an exemplary aspect, the locking ring 100 creates a locking layer to the assembly. This adds stability to the assembly by "crossing over" the seams formed by the split plates and spacers. In one embodiment, the locking ring 100 can be installed at every ⅞ inch to 1 and ½ inch layer so standard screws can be used. In one aspect, it is desirable to place a locking ring at every 1 and ½ inch layer. The locking ring, however, can be placed at any other desirable layer so as to provide additional stability and structural integrity to the assembly. In one embodiment, it is preferred that the locking ring not be closer than ⅞ inch because of the potential for the standard screw to interfere with the threaded hole below. The locking ring 100 can be installed as the top layer or as an intermediate layer of the assembly.

Figure 23:
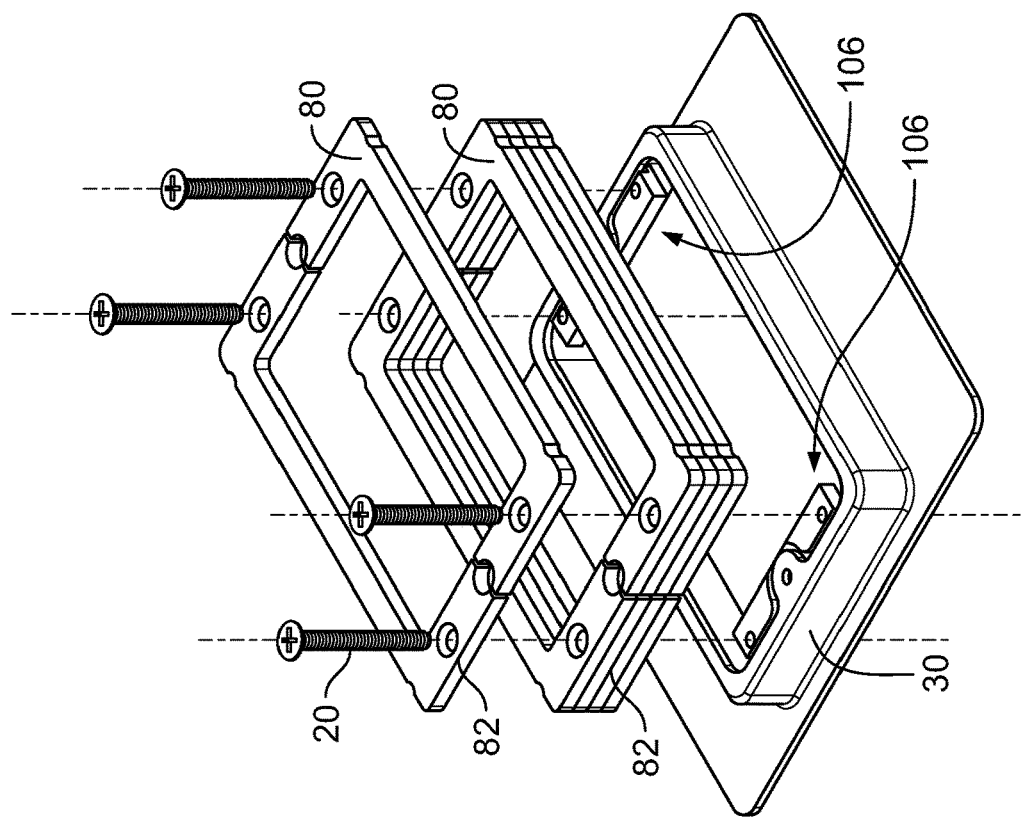
FIG. 23 is an exploded perspective view of exemplary stackable split plates with an exemplary backing plate.
Figure 22:
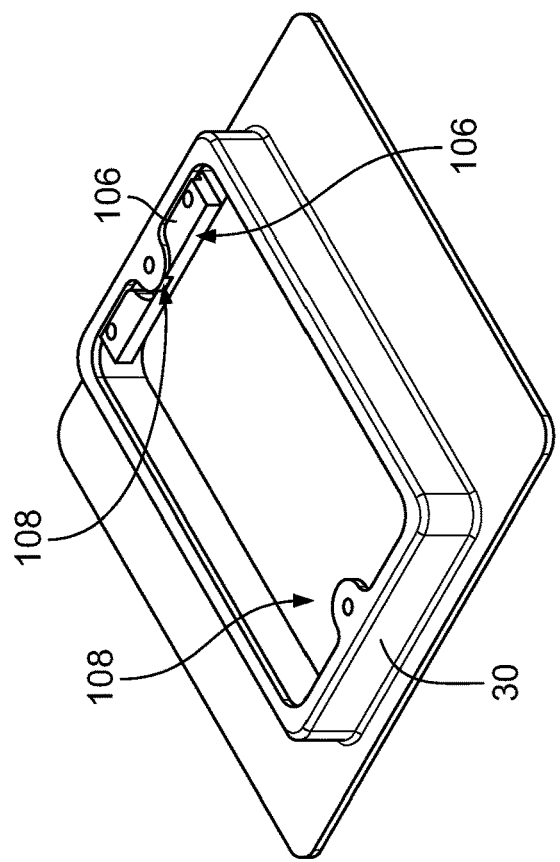
FIG. 22 is a perspective view of a ring having an exemplary backing plate.

In still yet another alternative aspect, as shown in FIGS. 22 and 23, a backing plate 106, as also described above, may be located on the opposite side (or rear side) of the existing ring and then the plates or split plates can be secured to the backing plate, using techniques described herein. The existing ring will effectively be clamped between the backing plate 106 and the plates. The backing plate defines a recessed cut-out portion that matches the shape of the arch 108 of the existing ring, as depicted in FIG. 22. The backing plate permits the assembly of the invention to be retrofitted to existing rings of the type depicted in FIG. 22.

It should be understood that while the embodiments disclosed in this application are described using English measurements, corresponding or similar Metric measurements may be used with the teachings of the invention.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

What is claimed is:

1. An assembly for an electrical or utility box where one or more components of the assembly are mounted to or removed from the assembly after drywall or wall materials have been installed, the assembly comprising:
    a ring mounted to the electrical box, the ring defining a planar portion and a ring portion extending outwardly from the planar portion, the ring portion defining an open ring center and a planar ring surface, the ring portion defining a plurality of holes in the planar ring surface; and
    one or more split plates mounted to the ring portion, the one or more split plates defining opposing planar surfaces, the one or more split plates stackable on the planar ring surface of the ring portion, the one or more split plates defining an open plate center, wherein the one or more split plates are mounted to and configured to be removed from the ring portion without removal of the drywall or wall materials,
    a locking ring mounted to the one or more split plates, wherein the locking ring crosses over a seam formed by two adjoining split plates;
    wherein the opposing planar surfaces define a plurality of holes, and wherein when the one or more split plates are stacked on the planar ring surface the plurality of holes in the opposing planar surfaces are aligned with the plurality of holes in the planar ring surface to receive a fastener for securing the one or more split plates to the planar ring surface,
    wherein the drywall or wall materials define a wall thickness and an outer finished wall surface, and
    wherein the one or more split plates are stacked to the same thickness as the wall thickness such that the planar surface of the outermost stacked split plate is aligned with the outer finished wall surface.

2. The assembly of claim 1, wherein the one or more split plates define the same thickness.

3. The assembly of claim 1, wherein the one or more split plates define different thicknesses.

4. The assembly of claim 3, wherein the one or more split plates include a first plate having a first thickness, and a second plate having a second thickness.

5. The assembly of claim 4, wherein the first thickness is different than the second thickness.

6. The assembly of claim 5, wherein the first thickness is selected from the group consisting of ⅛, ¼ and ½-inch thickness.

7. The assembly of claim 5, wherein the second thickness is selected from the group consisting of ⅛, ¼ and ½-inch thickness.

8. The assembly of claim 1, wherein the ring portion defines a ring thickness that is selected from the group consisting of ½ and ⅝-inch thickness.

9. The assembly of claim 8, wherein the ring portion defines a width of 2.1875 inches and the ring open center defines a width of 1.8125 inches.

10. The assembly of claim 1, wherein the one or more split plates are at least one spacer plate.

11. The assembly of claim 10, wherein the one or more split plates define a thickness that is selected from the group consisting of ⅛, ¼ and ½-inch thickness.

12. The assembly of claim 11, wherein the one or more split plates are at least two spacer plates each having a different length.

13. A method of mounting an assembly to an electrical or utility box where one or more components of the assembly are mounted to or removed from the assembly after drywall or wall materials have been installed, the method comprising the steps of:
    providing a ring to mount to an electrical box, the ring defining a planar portion and a ring portion extending outwardly from the planar portion, the ring portion defining an open ring center and a planar ring surface, the ring portion defining a plurality of holes in the planar ring surface;
    providing one or more split plates to mount to the ring portion, the one or more split plates defining opposing planar surfaces, the one or more split plates stackable on the planar ring surface of the ring portion, the one or more split plates defining an open plate center, the opposing planar surfaces define a plurality of holes;
    providing one or more locking rings to mount to the split plates;
    mounting the ring to the electrical box before the drywall or wall materials have been installed; and
    stacking the one or more split plates to the ring portion after the drywall or wall materials have been installed, stacking the one or more locking rings to the split plates, wherein at least one of the one or more locking rings crosses over a seam formed by two adjoining split plates, wherein the drywall or wall materials define a wall thickness and an outer finished wall surface, and wherein the one or more split plates and locking rings are stacked to the same thickness as the wall thickness such that the planar surface of the outermost stacked plate is aligned with the outer finished wall surface;

aligning the plurality of holes in the opposing planar surfaces of the ring with the plurality of holes in the planar ring surface; and inserting one or more fasteners through the plurality of holes in the opposing planar surfaces of the ring and into the plurality of holes in the planar ring surface to secure the one or more split plates and locking ring to the planar ring surface.

14. The method of claim 13, further comprising the step of providing the one or more split plates with the same thickness.

15. The method of claim 13, further comprising the step of providing the one or more split plates with different thicknesses.

16. The method of claim 15, further comprising the step of providing the one or more split plates with thicknesses selected from the group consisting of ⅛, ¼ and ½-inch thickness.

17. The method of claim 16, further comprising the step of providing the ring portion with a ring thickness that is selected from the group consisting of ½ and ⅝-inch thickness.

18. The method of claim 13, further comprising the step of providing a backing plate to the ring.

* * * * *